US012771244B2

(12) United States Patent
Lin et al.

(10) Patent No.: US 12,771,244 B2
(45) Date of Patent: Oct. 20, 2026

(54) RESONANT POWER CONVERTER, CONTROL CIRCUIT, AND CONTROL METHOD WITH FULL-WAVE RECTIFIED RESONANT CURRENT SENSING

(71) Applicant: Richtek Technology Corporation, Zhubei City (TW)

(72) Inventors: Tzu-Chen Lin, Hsinchu (TW); Ta-Yung Yang, Taoyuan (TW); Kuo-Chi Liu, Hsinchu (TW)

(73) Assignee: Richtek Technology Corporation, Zhubei City (TW)

( * ) Notice: Subject to any disclaimer, the term of this patent is extended or adjusted under 35 U.S.C. 154(b) by 178 days.

(21) Appl. No.: 18/789,924

(22) Filed: Jul. 31, 2024

(65) Prior Publication Data

US 2025/0192672 A1 Jun. 12, 2025

Related U.S. Application Data

(60) Provisional application No. 63/607,476, filed on Dec. 7, 2023.

(30) Foreign Application Priority Data

Jun. 11, 2024 (TW) ................................ 113121538

(51) Int. Cl.
*H02M 3/00* (2006.01)
*H02M 3/335* (2006.01)

(52) U.S. Cl.
CPC ......... *H02M 3/01* (2021.05); *H02M 3/33571* (2021.05)

(58) Field of Classification Search
CPC ............................ H02M 3/01; H02M 3/33571
See application file for complete search history.

(56) References Cited

U.S. PATENT DOCUMENTS

| | | | | |
|---|---|---|---|---|
| 8,085,558 B2 | 12/2011 | Choi | | |
| 8,699,240 B2 | 4/2014 | Adragna et al. | | |
| 9,065,350 B2 | 6/2015 | Halberstadt | | |
| 9,960,693 B1 * | 5/2018 | Feldtkeller | ............. | H02M 3/01 |
| 9,991,801 B2 | 6/2018 | Wang et al. | | |
| 2018/0062383 A1 | 3/2018 | Kawashima | | |

FOREIGN PATENT DOCUMENTS

| | | |
|---|---|---|
| CN | 109586580 A | 4/2019 |

* cited by examiner

*Primary Examiner* — Rafael O De Leon Domenech
(74) *Attorney, Agent, or Firm* — Tung & Associates

(57) ABSTRACT

A resonant power converter includes: a first transistor and a second transistor, configured to form a half-bridge circuit; a resonant circuit including a resonant inductor, a primary winding of a transformer, and a resonant capacitor, which are serially coupled to each other, and wherein the first and the second transistors are configured to switch the resonant circuit to generate a resonant current for converting an input voltage into an output voltage; and a conversion control circuit configured to generate a ramp signal based on the resonant current, and to generate a first drive signal and a second drive signal based on the ramp signal and a compensation signal related to the output voltage. The first drive signal and the second drive signal are respectively used to control the first transistor and the second transistor. During a signal period of the ramp signal, the ramp signal monotonically increases or monotonically decreases.

27 Claims, 10 Drawing Sheets

RESONANT POWER CONVERTER, CONTROL CIRCUIT, AND CONTROL METHOD WITH FULL-WAVE RECTIFIED RESONANT CURRENT SENSING

CROSS REFERENCE

The present invention claims priority to U.S. 63/607,476 filed on Dec. 7, 2023. The present invention claims priority to TW patent application No. 113121538, filed on Jun. 11, 2024 and published as TW202524834A on Jun. 16, 2025, the entire contents of which are incorporated herein by reference.

BACKGROUND OF THE INVENTION

Field of Invention

The present invention relates to a resonant power converter, particularly to a high-efficiency and low-power consumption resonant power converter with improved transient response capability. The present invention also relates to a conversion control circuit and method for controlling the resonant power converter.

Description of Related Art

The following prior art works are relevant to the present invention: U.S. Pat. No. 8,085,558B2 and U.S. Pat. No. 9,065,350B2.

FIG. 1 shows a schematic diagram of a prior art resonant power converter. As shown in FIG. 1, in the prior art resonant power converter 900, resistors R1 and R2 sense the voltage VCr across the resonant capacitor Cr to generate a divided voltage k*VCr. The divided voltage k*VCr has a proportional relationship with a factor of k to the voltage VCr across the resonant capacitor Cr, where k is greater than 0 and less than 1. The divided voltage k*VCr is added to the bias voltage Vdm to generate a first bias signal VCrh, and the divided voltage k*VCr is subtracted from the bias voltage Vdm to generate a second bias signal VCrl, wherein the level of the first bias signal VCrh is higher than that of the second bias signal VCrl. The control circuit 90 generates a high-side drive signal SH and a low-side drive signal SL based on the first bias signal VCrh, the second bias signal VCrl, and a feedback signal Vfb related to the output voltage Vout to respectively control the high-side transistor QH and the low-side transistor QL.

One of the drawbacks of the above prior art is that using resistors R1 and R2 for voltage division causes additional power loss. Furthermore, the prior art requires biasing the divided voltage k*VCr to generate a higher bias signal and a lower bias signal, and subsequently processing the higher and lower bias signals, which increases circuit complexity and results in poor transient response capability.

In view of the above, the present invention addresses the deficiencies of the prior art by providing a high-efficiency and low-power consumption resonant power converter. The resonant power converter of the present invention achieves this goal by full-wave rectifying the resonant-related signal of the resonant current, and subsequently processing the rectified signal, such as by integration or differentiation, to generate a ramp signal. The ramp signal and a compensation signal related to the output voltage are subsequently used to generate drive signals, thereby controlling the switching of the high-side transistor and the low-side transistor. The present invention solves the power consumption problem caused by the voltage division circuit in the prior art, and by using full-wave rectification, it allows the high-side and low-side transistors to be independently controlled within a same period, thereby enhancing the transient response capability of the resonant power converter.

SUMMARY OF THE INVENTION

From one perspective, the present invention provides a resonant power converter, comprising: a first transistor and a second transistor, configured to form a half-bridge circuit; a resonant circuit, including a resonant inductor, a primary winding of a transformer, and a resonant capacitor, wherein the resonant inductor, the primary winding of the transformer, and the resonant capacitor are serially coupled to each other, and wherein the first transistor and the second transistor are configured to switch the resonant circuit to generate a resonant current for converting an input voltage into an output voltage; and a conversion control circuit, configured to generate a ramp signal based on the resonant current, and to generate a first drive signal and a second drive signal based on the ramp signal and a compensation signal related to the output voltage, wherein the first drive signal and the second drive signal are respectively configured to control the first transistor and the second transistor; wherein during a signal period of the ramp signal, the ramp signal monotonically increases or monotonically decreases.

In one embodiment, during a switching period of the first drive signal or the second drive signal, an ON-time of the first drive signal and an ON-time of the second drive signal are optionally equal or unequal, thereby enhancing the transient response capability of the resonant power converter.

In one embodiment, the signal period of the ramp signal is shorter than a switching period of the first drive signal or the second drive signal.

In one embodiment, the conversion control circuit is further configured to adjust a switching period of the first drive signal and/or the second drive signal based on a comparison of the ramp signal and the compensation signal, thereby adjusting a phase of the resonant current to regulate an output power level related to the output voltage.

In one embodiment, the ramp signal is further generated based on a differentiation or integration of a resonant-related signal associated with the resonant current.

In one embodiment, the conversion control circuit includes a rectification circuit configured to full-wave rectify a sensing signal related to the resonant current to generate a resonant-related signal associated with the resonant current.

In one embodiment, the conversion control circuit includes: a trans-conductance amplification circuit, configured to generate a trans-conductance amplified current based on the resonant-related signal; and an integration circuit, including an integration capacitor, configured to integrate an integration current to generate the ramp signal, wherein the integration current includes the trans-conductance amplified current; wherein the first drive signal and the second drive signal are further generated based on a comparison of the ramp signal and the compensation signal.

In one embodiment, the rectification circuit includes: a plurality of switches, including a first group of switches and a second group of switches which are coupled in parallel with each other, wherein the first group of switches are configured to switch according to the first drive signal, and the second group of switches are configured to switch according to the second drive signal, thereby full-wave rectifying the sensing signal to generate the resonant-related signal.

In one embodiment, the conversion control circuit further includes a sensing circuit configured to generate the sensing signal based on the resonant current.

In one embodiment, the integration current further includes a ramp compensation current for compensating a slope of the trans-conductance amplified current.

In one embodiment, the ramp compensation current is related to the input voltage for achieving feedforward control.

In one embodiment, the conversion control circuit includes: a differentiation circuit configured to differentiate the resonant-related signal to generate the ramp signal; wherein the first drive signal and the second drive signal are further generated based on a comparison of the ramp signal and the compensation signal.

From another perspective, the present invention provides a conversion control circuit for controlling a resonant power converter, wherein the resonant power converter includes a first transistor, a second transistor, and a resonant circuit, wherein the first transistor and the second transistor are configured to form a half-bridge circuit, wherein the resonant circuit includes a resonant inductor, a primary winding of a transformer, and a resonant capacitor, wherein the resonant inductor, the primary winding of the transformer, and the resonant capacitor are serially coupled to each other, and wherein the first transistor and the second transistor are configured to switch the resonant circuit to generate a resonant current for converting an input voltage into an output voltage; the conversion control circuit comprising: a sensing circuit, configured to generate a sensing signal based on the resonant current; and a signal processing circuit, configured to generate a ramp signal based on the sensing signal; wherein the conversion control circuit is configured to generate a first drive signal and a second drive signal based on the ramp signal and a compensation signal related to the output voltage, wherein the first drive signal and the second drive signal are respectively configured to control the first transistor and the second transistor; wherein during a signal period of the ramp signal, the ramp signal monotonically increases or monotonically decreases.

From another perspective, the present invention provides a conversion control method for controlling a resonant power converter, wherein the resonant power converter includes a first transistor, a second transistor, and a resonant circuit, wherein the first transistor and the second transistor are configured to form a half-bridge circuit, wherein the resonant circuit includes a resonant inductor, a primary winding of a transformer, and a resonant capacitor, wherein the resonant inductor, the primary winding of the transformer, and the resonant capacitor are serially coupled to each other, and wherein the first transistor and the second transistor are configured to switch the resonant circuit to generate a resonant current for converting an input voltage into an output voltage; the conversion control method comprising: generating a sensing signal based on the resonant current; generating a ramp signal based on the sensing signal; and generating a first drive signal and a second drive signal based on the ramp signal and a compensation signal related to the output voltage, wherein the first drive signal and the second drive signal are respectively configured to control the first transistor and the second transistor; wherein during a signal period of the ramp signal, the ramp signal monotonically increases or monotonically decreases.

Embodiments of the present invention provide a high-efficiency and low-power consumption resonant power converter. The resonant power converter of the present invention achieves this goal by full-wave rectifying the resonant-related signal of the resonant current, and subsequently processing the rectified signal, such as by integration or differentiation, to generate a ramp signal. The ramp signal and a compensation signal related to the output voltage are subsequently used to generate drive signals, thereby controlling the switching of the high-side transistor and the low-side transistor. The present invention solves the power consumption problem caused by the voltage division circuit, and by using full-wave rectification, it allows the high-side and low-side transistors to be independently controlled within a same period, thereby enhancing the transient response capability of the resonant power converter.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
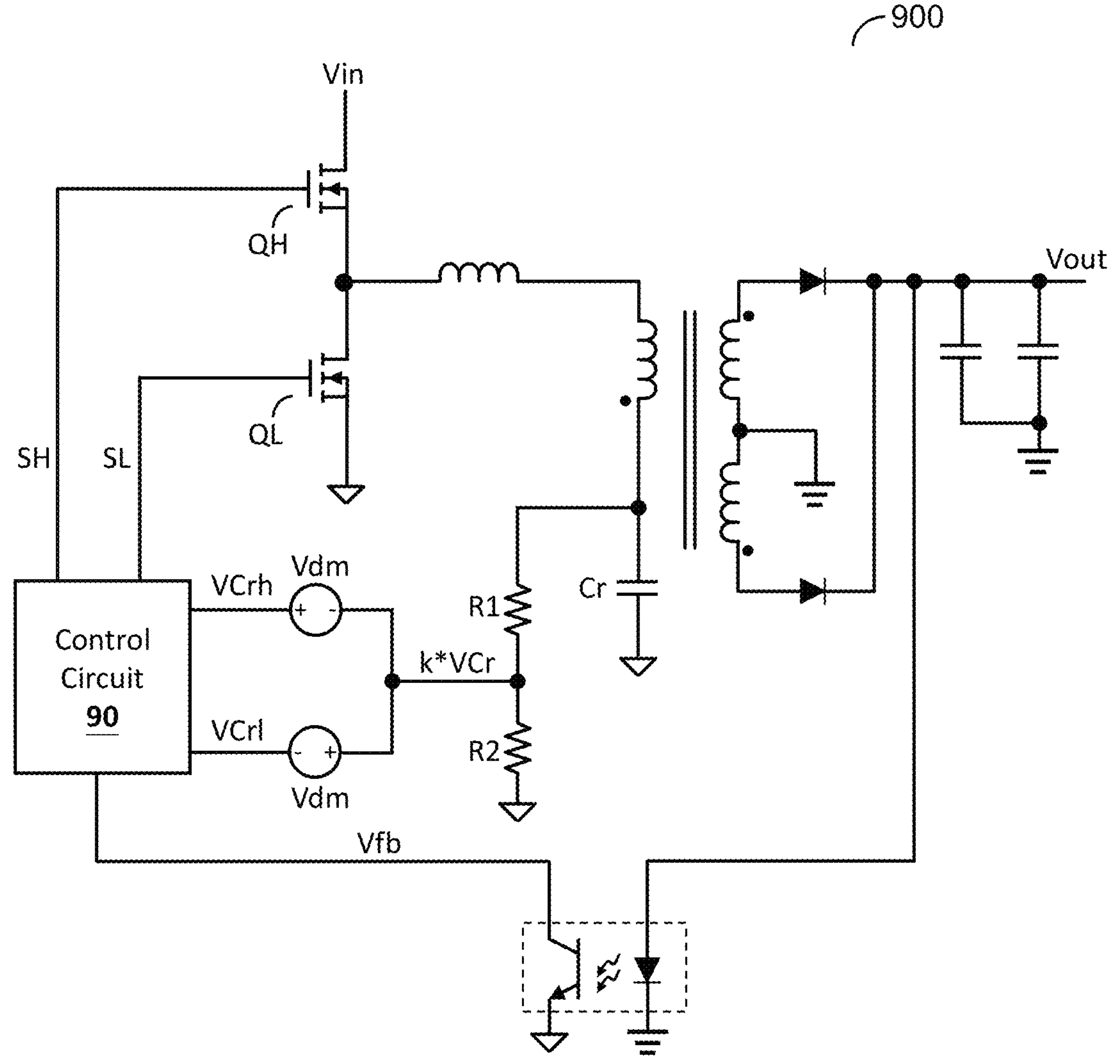
Fig. 1 (Prior Art)
FIG. 1 shows a schematic diagram of a prior art resonant power converter.
Figure 2:
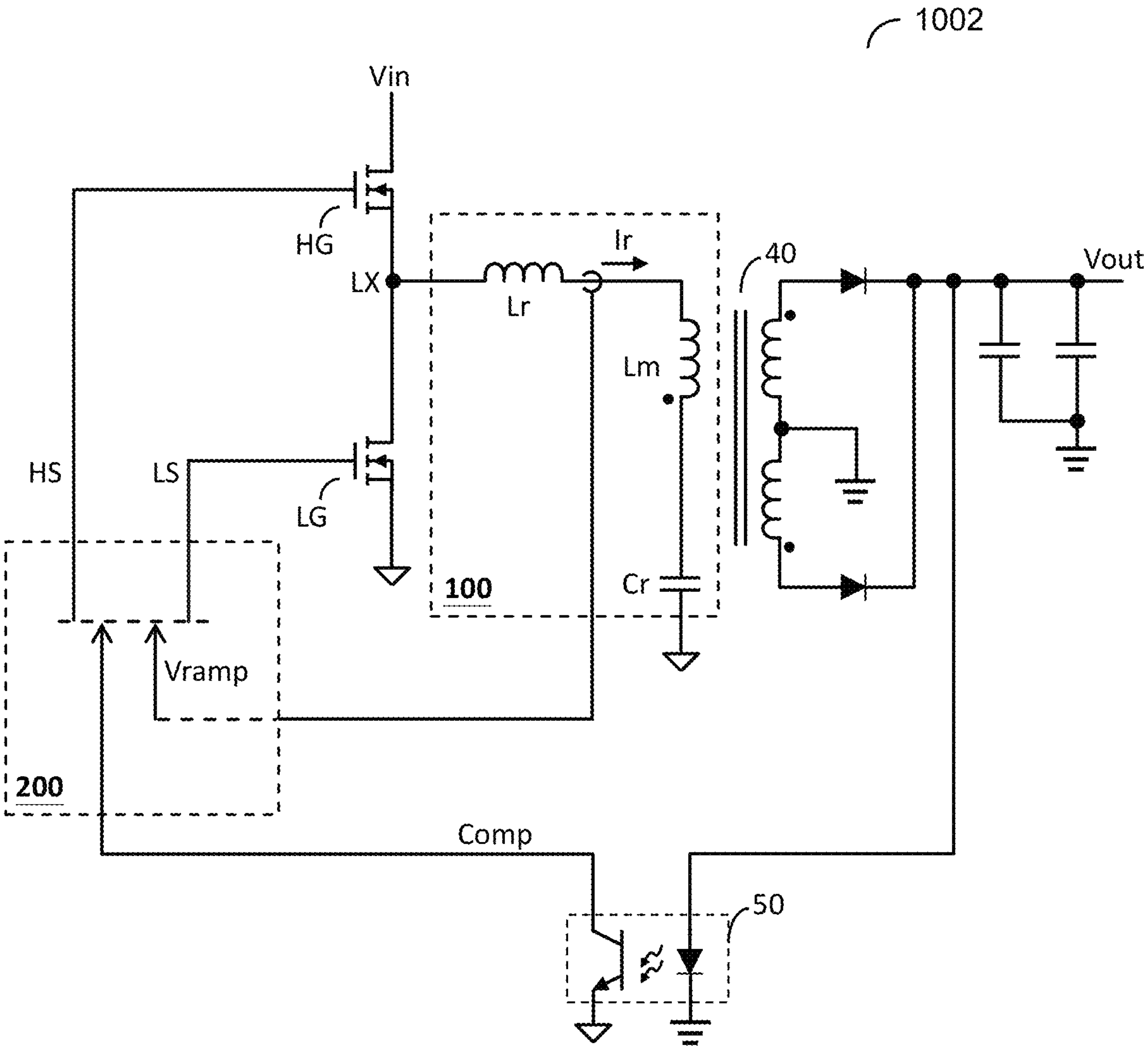
FIG. 2 shows a block diagram of an embodiment of a resonant power converter according to the present invention.

FIG. 2 shows a block diagram of an embodiment of a resonant power converter according to the present invention. In one embodiment, a resonant power converter 1002 comprises: a first transistor HG, a second transistor LG, a resonant circuit 100, and a conversion control circuit 200. In this embodiment, the first transistor HG is a high-side transistor, and the second transistor LG is a low-side transistor. The first transistor HG and the second transistor LG are configured to form a half-bridge circuit. In one embodiment, the resonant circuit 100 includes a resonant inductor Lr and a resonant capacitor Cr. In this embodiment, the resonant circuit 100 further includes a primary winding Im of a transformer 40. The resonant inductor Lr, the primary winding Lm, and the resonant capacitor Cr are sequentially coupled in series at a switching node LX between the first transistor HG and the second transistor LG. In this embodiment, the first transistor HG and the second transistor LG are configured to switch the resonant circuit 100 to generate a resonant current Ir, thereby converting an input voltage Vin to an output voltage Vout. The conversion control circuit 200 is configured to generate a ramp signal Vramp based on the resonant current Ir, and to generate a first drive signal HS and a second drive signal LS based on the ramp signal Vramp and a compensation signal Comp related to the output voltage Vout. The first drive signal HS and the second drive signal LS are respectively configured to control the first transistor HG and the second transistor LG. In one embodiment, the compensation signal Comp is generated based on the output voltage Vout via an isolation component (such as the optocoupler 50 shown in FIG. 2).

Figure 3:
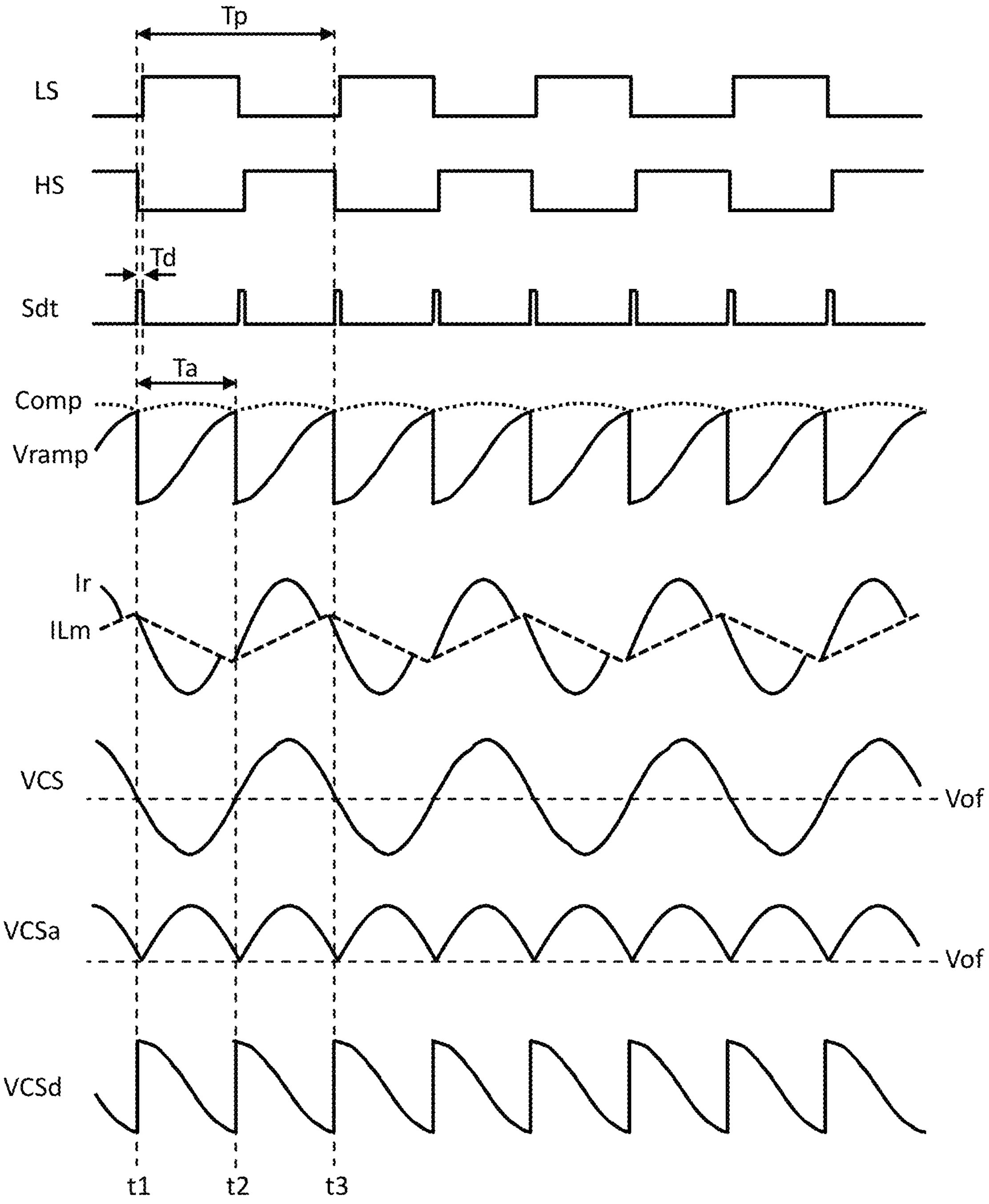
FIG. 3 shows an operating waveform diagram of an embodiment of the resonant power converter according to the present invention.

Please refer to both FIG. 2 and FIG. 3. FIG. 3 shows an operating waveform diagram of an embodiment of the resonant power converter according to the present invention. In one embodiment, as shown in FIG. 3, during a signal period Ta of the ramp signal Vramp, the ramp signal Vramp monotonically increases or monotonically decreases. For example, in the embodiment shown in FIG. 3, the ramp signal Vramp monotonically increases from time point t1 to t2. In one embodiment, the ramp signal Vramp is related to the integration or differentiation of a sine wave, particularly the integration or differentiation of the positive half-cycle of the sine wave. Thus, it can be a waveform segment with a monotonically increasing characteristic, such as a positive or negative half-cycle of a cosine wave. In one embodiment, during a switching period Tp of the first drive signal HS or the second drive signal LS, the ON-time of the first drive signal HS and the ON-time of the second drive signal are optionally equal or unequal, thereby enhancing the transient response capability of the resonant power converter 1002. The operational details will be described in more detail in subsequent embodiments.

Figure 4:
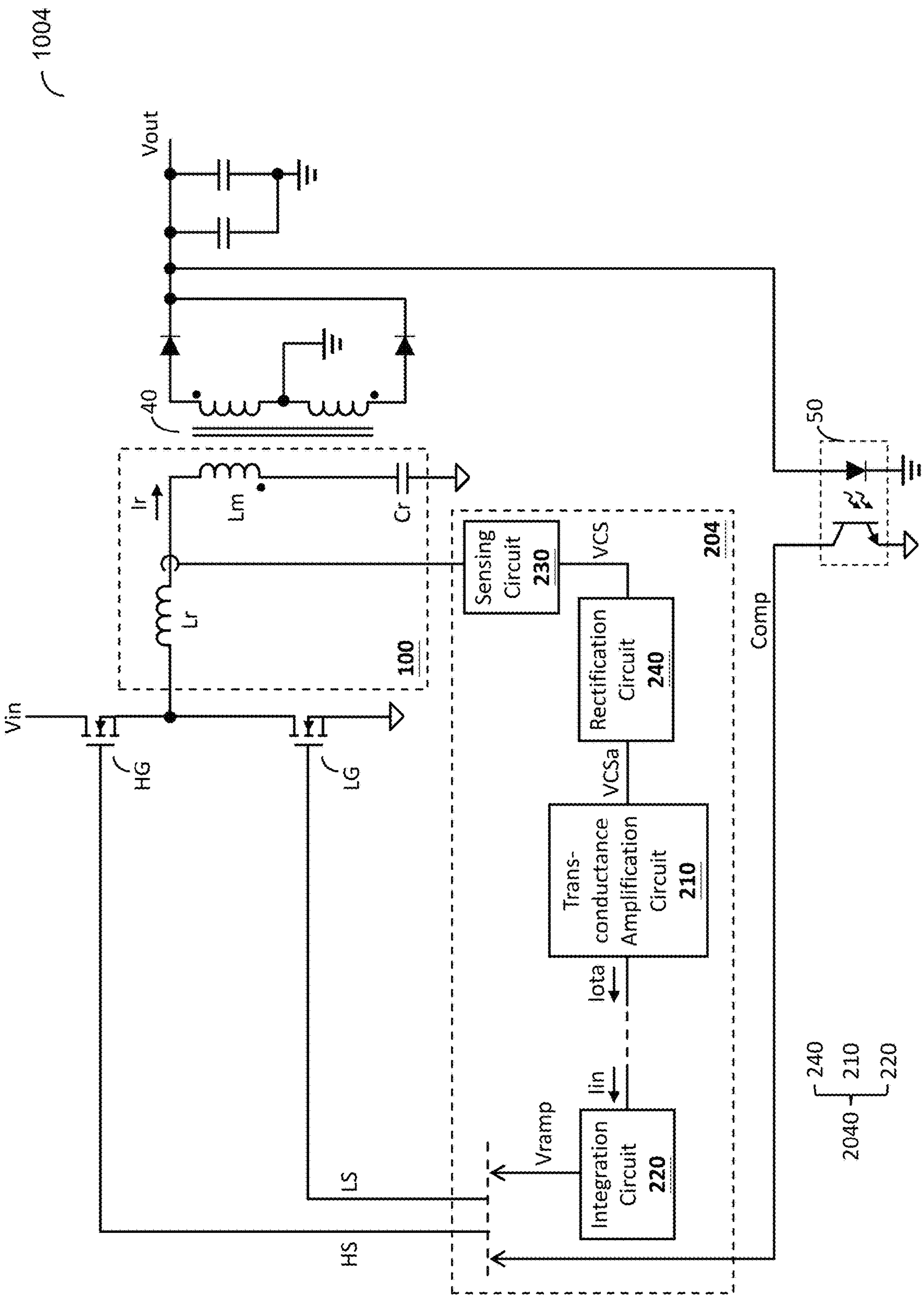
FIG. 4 shows a block diagram of an embodiment of the resonant power converter according to the present invention.

FIG. 4 shows a block diagram of an embodiment of the resonant power converter according to the present invention. As shown in FIG. 4, in one embodiment, the conversion control circuit 204 of the resonant power converter 1004 includes a sensing circuit 230 and a signal processing circuit 2040. In this embodiment, the signal processing circuit 2040 includes a rectification circuit 240, a trans-conductance amplification circuit 210, and an integration circuit 220. In one embodiment, the sensing circuit 230 is configured to generate a sensing signal VCS based on the resonant current Ir. The rectification circuit 240 is configured to full-wave rectify the sensing signal VCS to generate a resonant-related signal VCSa associated with the resonant current Ir. The trans-conductance amplification circuit 210 is configured to generate a trans-conductance amplified current Iota based on the resonant-related signal VCSa. The integration circuit 220 is configured to integrate an integration current Iin to generate the ramp signal Vramp. In this embodiment, the integration current Iin includes the trans-conductance amplified current Iota. In one embodiment, the first drive signal HS and the second drive signal LS are generated based on a comparison of the ramp signal Vramp and the compensation signal Comp.

Figure 5:
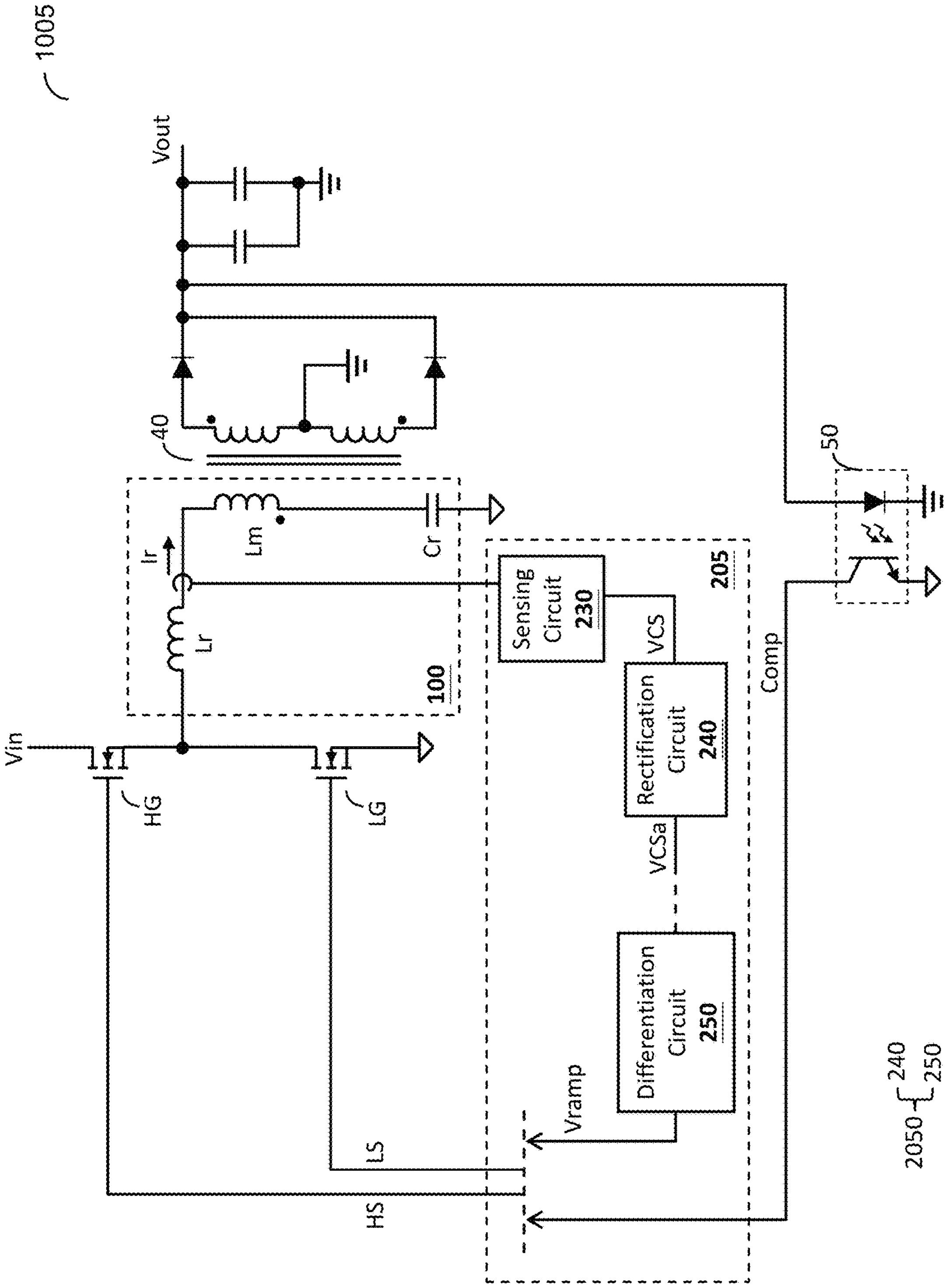
FIG. 5 shows a block diagram of an embodiment of the resonant power converter according to the present invention.

FIG. 5 shows a block diagram of an embodiment of the resonant power converter according to the present invention. As shown in FIG. 5, in one embodiment, the conversion control circuit 205 of the resonant power converter 1005 includes a sensing circuit 230 and a signal processing circuit 2050. In this embodiment, the signal processing circuit 2050 includes a rectification circuit 240 and a differentiation circuit 250. In one embodiment, the sensing circuit 230 is configured to generate a sensing signal VCS based on the resonant current Ir. The rectification circuit 240 is configured to full-wave rectify the sensing signal VCS to generate a resonant-related signal VCSa associated with the resonant current Ir. In this embodiment, the differentiation circuit 250 is configured to generate the ramp signal Vramp based on the differentiation of the resonant-related signal VCSa. Similar to the embodiment shown in FIG. 4, in this embodiment, the first drive signal HS and the second drive signal LS are generated based on a comparison of the ramp signal Vramp and the compensation signal Comp.

Figure 6:
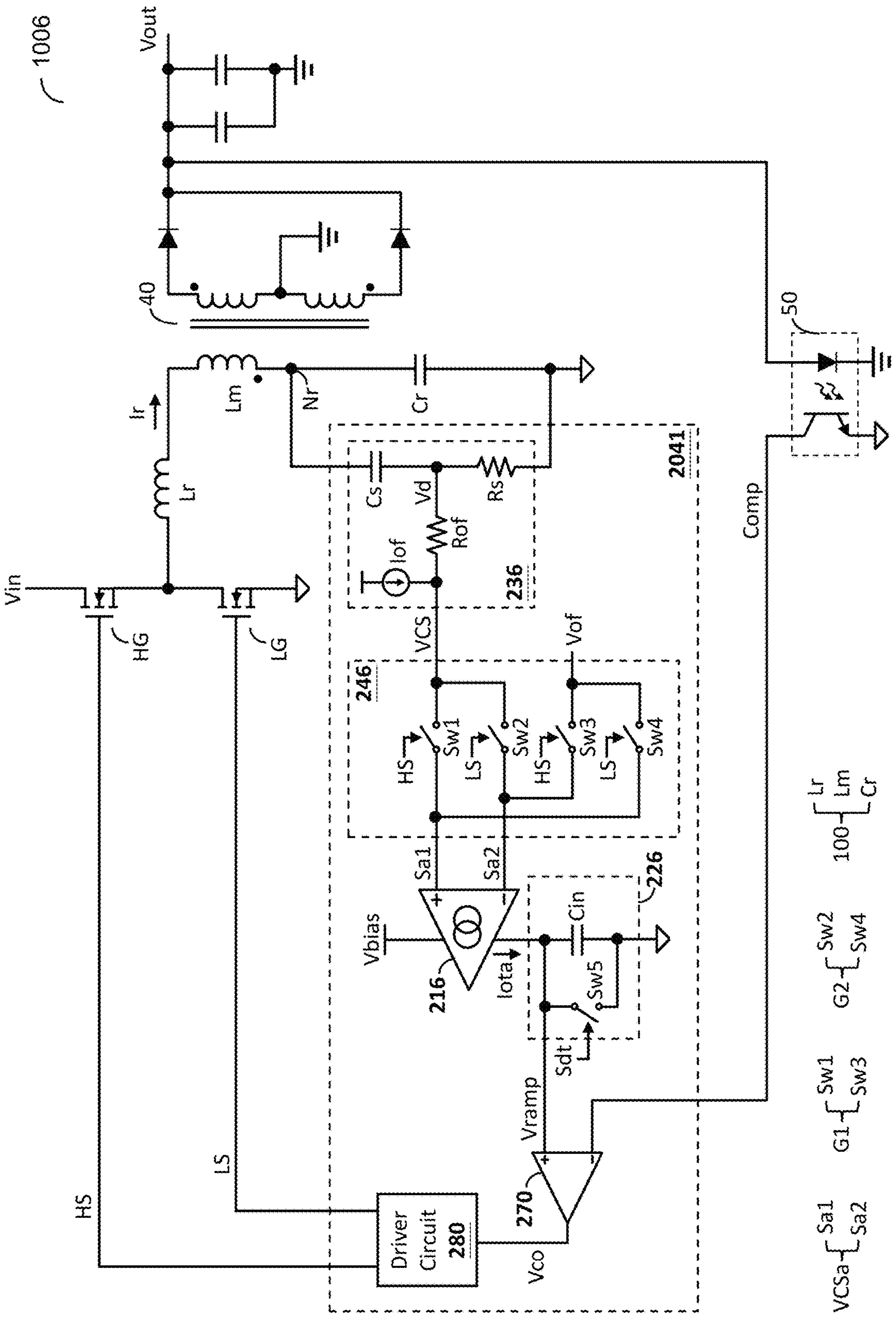
FIG. 6 shows a schematic diagram of a specific embodiment of the resonant power converter corresponding to FIG. 4 according to the present invention.

FIG. 6 shows a schematic diagram of a specific embodiment of the resonant power converter corresponding to FIG. 4 according to the present invention. The resonant power converter 1006 of FIG. 6 is a specific embodiment of the resonant power converter 1004 of FIG. 4. In the embodiment of FIG. 6, the conversion control circuit 2041 further includes a comparator 270 and a driver circuit 280. In this embodiment, the trans-conductance amplification circuit is configured as a trans-conductance amplifier 216. The sensing circuit 236 includes a sensing capacitor Cs, a sensing resistor Rs, a bias current source Iof, and a bias resistor Rof. The integration circuit 226 includes an integration capacitor Cin and a switch Sw5. In one embodiment, the sensing circuit 236 is coupled to a node Nr between the primary winding Im and the resonant capacitor Cr. Specifically, the sensing capacitor Cs is coupled between the node Nr and the sensing resistor Rs, and the sensing resistor Rs is coupled between the sensing capacitor Cs and ground potential. The sensing capacitor Cs and the sensing resistor Rs are configured to differentiate the voltage across the resonant capacitor Cr to generate a differentiated signal Vd which represents the resonant current Ir. The bias current source Iof and the bias resistor Rof are configured to generate a bias voltage Vof to offset the DC voltage value of the differentiated signal Vd, thereby generating a sensing signal VCS.

In one embodiment, the rectification circuit 246 includes a plurality of switches. The plurality of switches include a first group of switches G1 and a second group of switches G2 coupled in parallel with each other. The first group of switches G1 is configured to switch according to the first drive signal HS, and the second group of switches G2 is configured to switch according to the second drive signal LS, thereby full-wave rectifying the sensing signal VCS to generate the resonant-related signal VCSa. In this embodiment, the resonant-related signal VCSa includes signals Sa1 and Sa2. In one embodiment, the first group of switches G1 includes switch Sw1 and switch Sw3, and the second group of switches G2 includes switch Sw2 and switch Sw4. In this embodiment, the switch Sw1 is coupled between the sensing signal VCS and a positive input of the trans-conductance amplifier 216, the switch Sw2 is coupled between the sensing signal VCS and a negative input of the trans-conductance amplifier 216, the switch Sw3 is coupled between the bias voltage Vof and the negative input of the trans-conductance amplifier 216, and the switch Sw4 is coupled between the bias voltage Vof and the positive input of the trans-conductance amplifier 216.

It should be noted that when the first drive signal HS controls the switches Sw1 and Sw3 to turn on, the signal Sa1 corresponds to the sensing signal VCS, and the signal Sa2 corresponds to the bias voltage Vof, such that the resonant-related signal VCSa is positively related to the sensing signal VCS. When the second drive signal LS controls the switches Sw2 and Sw4 to turn on, the signal Sa2 corresponds to the sensing signal VCS, and the signal Sa1 corresponds to the bias voltage Vof, such that the resonant-related signal VCSa is negatively related to the sensing signal VCS. Through the operation of the first group of switches G1 and the second group of switches G2, and their coupling relationship with the trans-conductance amplifier 216, the resonant-related signal VCSa corresponds to the sensing signal VCS after being full-wave rectified. In other words, the resonant-related signal VCSa corresponds to a difference between the signals Sa1 and Sa2.

In one embodiment, as shown in FIG. 6, the trans-conductance amplifier 216 is powered by a bias Vbias and is configured to convert the resonant-related signal VCSa to generate a trans-conductance amplified current Iota. In this embodiment, the positive input and the negative input of the trans-conductance amplifier 216 respectively receive signals Sa1 and Sa2 to generate a trans-conductance amplified current Iota linearly related to the resonant-related signal VCSa. In one embodiment, the integration capacitor Cin is configured to integrate the trans-conductance amplified current Iota, and the switch Sw5 is configured to reset the voltage of the integration capacitor Cin according to the dead-time signal Sdt, thereby generating the ramp signal Vramp. In one embodiment, the comparator 270 is configured to compare the ramp signal Vramp with the compensation signal Comp to generate a comparison result Vco. The driver circuit 280 is configured to generate the first drive signal HS and the second drive signal LS based on the comparison result Vco, thereby respectively controlling the first transistor HG and the second transistor LG.

Please refer to both FIG. 3 and FIG. 6. As shown in FIG. 3, in one embodiment, the waveform of the resonant current Ir has a resonant characteristic, and a current ILm of the primary winding Im is close to a triangular wave. In one embodiment, the waveform of the sensing signal VCS corresponds to the waveform of the resonant current Ir, and the waveform of the resonant-related signal VCSa corresponds to the waveform of the sensing signal VCS after being full-wave rectified. In one embodiment, the DC voltage value of the sensing signal VCS is the bias voltage Vof, and the valley value of the resonant-related signal VCSa is the bias voltage Vof, thereby ensuring that the voltage value of the resonant-related signal VCSa is, for example, greater than 0. In the embodiment of FIG. 6, the ramp signal Vramp is related to the integration of the resonant-related signal VCSa. For example, at time point t1 in FIG. 3, the ramp signal Vramp is generated by integrating the trans-conductance amplified current Iota derived from the resonant-related signal VCSa, and at time point t2, the integration value is reset according to the dead-time signal Sdt. In one embodiment, the signal period Ta of the ramp signal Vramp is shorter than the switching period Tp of the first drive signal HS or the second drive signal LS (e.g., Ta=Tp/2). In this embodiment, the conversion control circuit 2041 is further configured to adjust the switching period Tp of the first drive signal HS or the second drive signal LS based on the compensation signal Comp. Specifically, in one embodiment, the intersection points of the ramp signal Vramp and the compensation signal Comp determine the switching points of the first drive signal HS and the second drive signal LS (such as time points t1 or t2, which are also the reset points of the ramp signal Vramp), thereby adjusting the phase of the resonant current Ir to regulate the output power level related to the output voltage Vout. Specifically, in this embodiment, the intersection points of the ramp signal Vramp and the compensation signal Comp determine the rising edge of the dead-time signal Sdt. The conversion control circuit 2041 is further configured to determine the dead time Td, during which neither the first drive signal HS nor the second drive signal LS is ON.

It should be noted that according to the present invention, the level of the compensation signal Comp determines the intersection points of the ramp signal Vramp and the compensation signal Comp, so as to determine the switching phase of the first drive signal HS and the second drive signal LS, thereby determining the switching frequency thereof. This adjusts the phase of the resonant current Ir (i.e., the degree of resonance), thereby regulating the output power level. Compared to the complex circuits of the prior art, the ON-time of the first drive signal HS and the ON-time of the second drive signal LS can be unequal due to the characteristics of the ramp signal Vramp, according to the present invention. This enables the adjustment of the output power level at each switching point (e.g., time points t1, t2, or t3) of the first drive signal HS and the second drive signal LS, thereby enhancing the transient response capability of the resonant power converter. Moreover, the circuit configuration of the present invention is simpler, thereby improving efficiency and cost.

Figure 7:
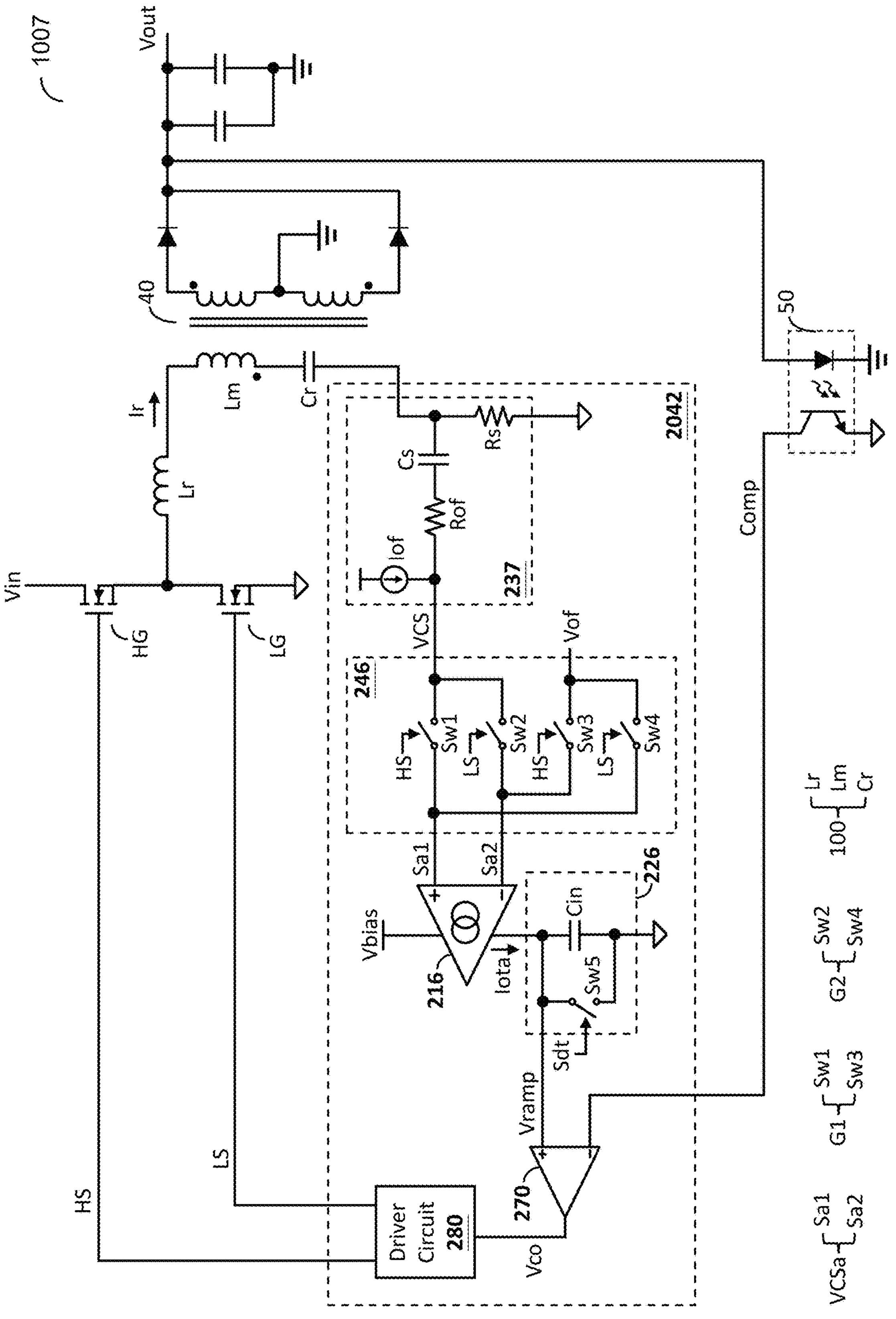
FIG. 7 shows a schematic diagram of a specific embodiment of the resonant power converter corresponding to FIG. 4 according to the present invention.

FIG. 7 shows a schematic diagram of a specific embodiment of the resonant power converter corresponding to FIG. 4 according to the present invention. The resonant power converter 1007 of FIG. 7 is similar to the resonant power converter 1006 of FIG. 6. The difference is that, in the embodiment of FIG. 7, the sensing circuit 237 of the conversion control circuit 2042 is coupled to the resonant capacitor Cr. Specifically, in the sensing circuit 237, the sensing resistor Rs is coupled between the resonant capacitor Cr and the ground potential, wherein the voltage across the sensing resistor Rs is proportional to the resonant current Ir. The sensing capacitor Cs is coupled between the resonant capacitor Cr and the bias resistor Rof to block the DC component of the voltage across the sensing resistor Rs. The sensing circuit 237 is configured to sense and bias the AC component of the voltage across the sensing resistor Rs to generate the sensing signal VCS. Other details of FIG. 7 can be deduced from the description of FIG. 6.

Figure 8:
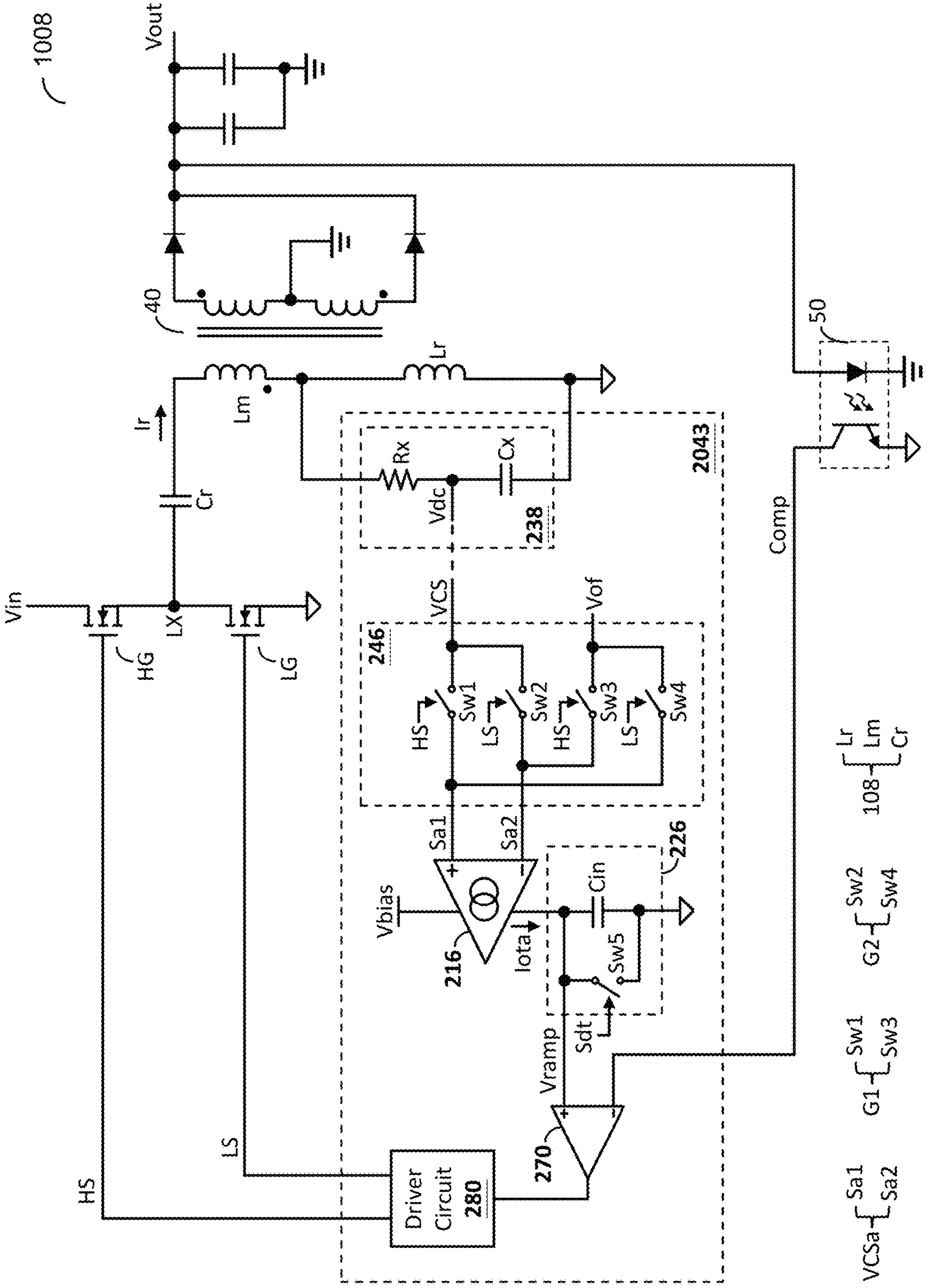
FIG. 8 shows a schematic diagram of a specific embodiment of the resonant power converter according to the present invention.

FIG. 8 shows a schematic diagram of a specific embodiment of the resonant power converter according to the present invention. The resonant power converter 1008 of FIG. 8 is similar to the resonant power converter 1006 of FIG. 6. Compared to the embodiment of FIG. 6, in the resonant circuit 108 of FIG. 8, the resonant capacitor Cr, the primary winding Im, and the resonant inductor Lr are sequentially coupled to the switching node LX. In this embodiment, as shown in FIG. 8, the sensing circuit 238 of the conversion control circuit 2043 includes a sensing resistor Rx and a sensing capacitor Cx which are serially coupled. The serially-coupled sensing resistor Rx and the sensing capacitor Cx are coupled in parallel with the resonant inductor Lr to perform DCR sensing on the resonant inductor Lr to generate a pre-sensing signal Vdc. The time constant of the sensing resistor Rx and the sensing capacitor Cx matches the time constant of the resonant inductor Lr and its DC resistance. As a result, the voltage across the sensing capacitor Cx is proportional to the resonant current Ir. The pre-sensing signal Vdc is subsequently processed by a DC determination circuit to generate the sensing signal VCS. Other details of FIG. 8 can be deduced from the description of FIG. 6.

Figure 9:
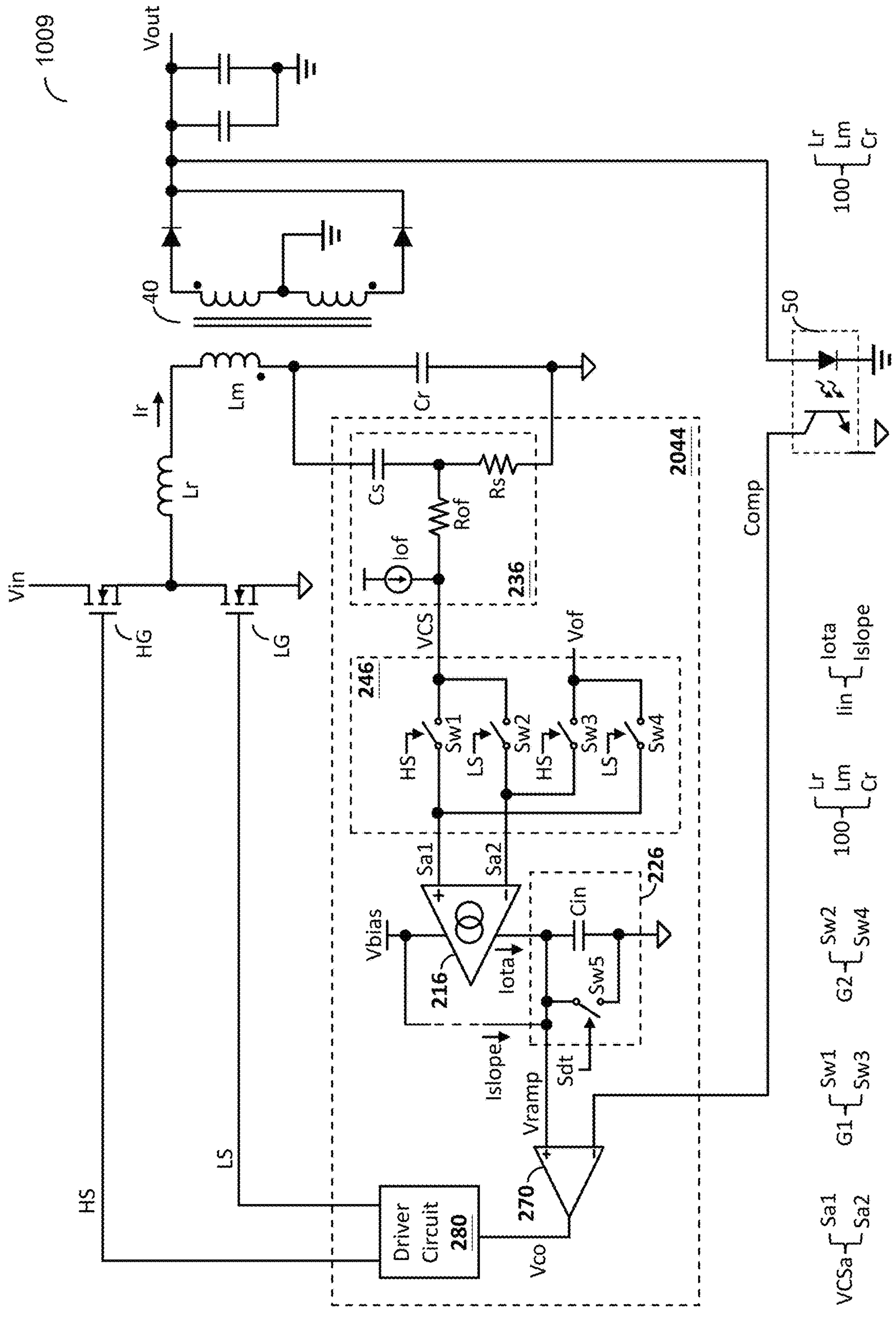
FIG. 9 shows a schematic diagram of a specific embodiment of the resonant power converter corresponding to FIG. 4 according to the present invention.

FIG. 9 shows a schematic diagram of a specific embodiment of the resonant power converter corresponding to FIG. 4 according to the present invention. The resonant power converter 1009 of FIG. 9 is similar to the resonant power converter 1006 of FIG. 6. The difference is that, in the embodiment of FIG. 9, the integration current Iin of the conversion control circuit 2044 further includes a ramp compensation current Islope to compensate the slope of the trans-conductance amplified current Iota. In this embodiment, the ramp compensation current Islope is rendered to be related to the input voltage Vin to achieve feedforward control. Other details of FIG. 9 can be deduced from the description of FIG. 6.

Figure 10:
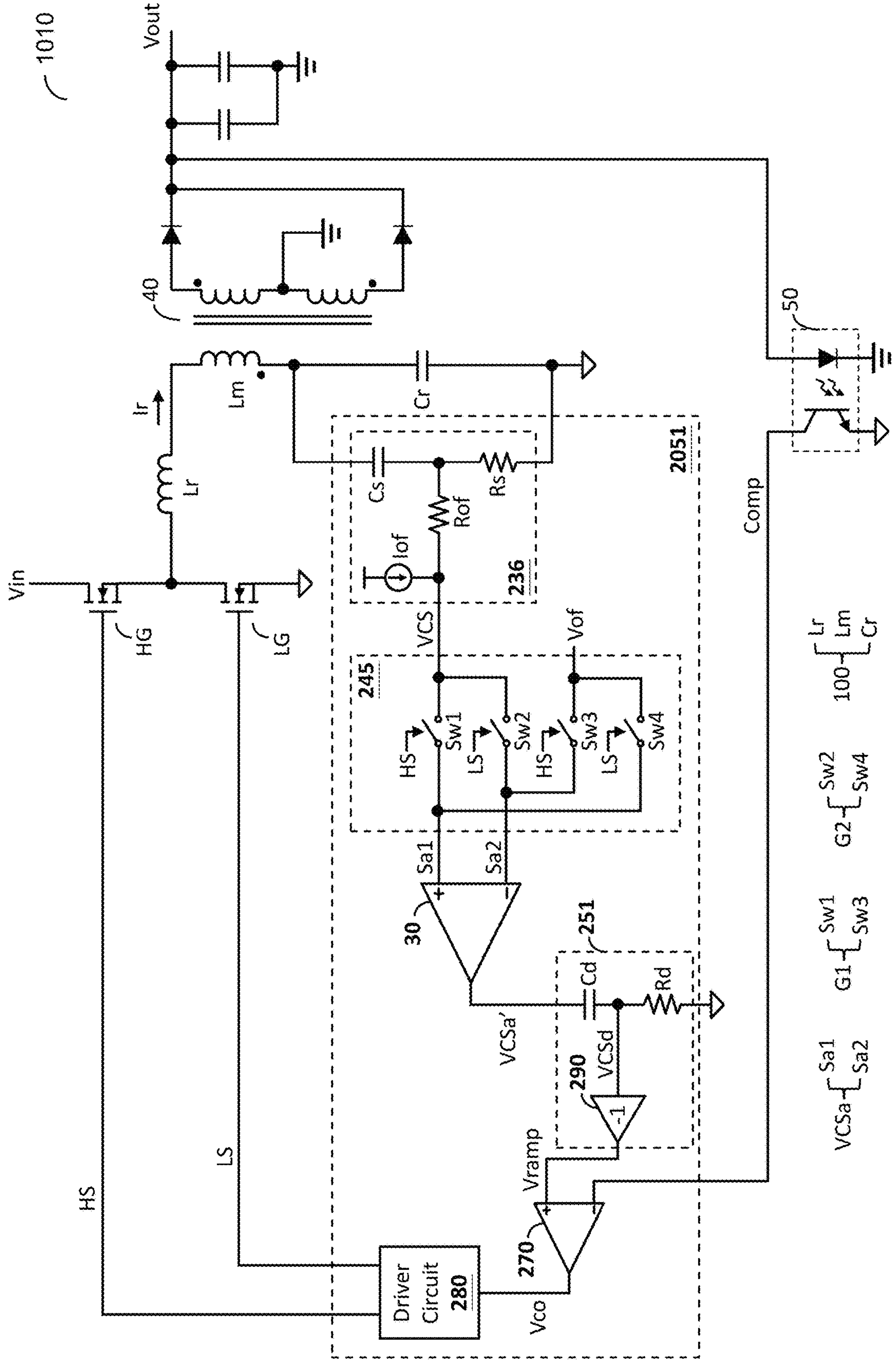
FIG. 10 shows a schematic diagram of a specific embodiment of the resonant power converter corresponding to FIG. 5 according to the present invention.

FIG. 10 shows a schematic diagram of a specific embodiment of the resonant power converter corresponding to FIG. 5 according to the present invention. The resonant power converter 1010 of FIG. 10 is a specific embodiment of the resonant power converter 1005 of FIG. 5. In the embodiment of FIG. 10, the conversion control circuit 2051 further includes a buffer 30, a comparator 270, and a driver circuit 280. The configuration and operation of the sensing circuit 236 are the same as those in FIG. 6, and details can be found in the description of FIG. 6. The rectification circuit 245 includes a plurality of switches which include a first group of switches G1 (switches Sw1 and Sw3) and a second group of switches G2 (switches Sw2 and Sw4). In this embodiment, the switches Sw1 and Sw4 are coupled to a positive input of the buffer 30, and the switches Sw2 and Sw3 are coupled to a negative input of the buffer 30. Other operational details of the plurality of switches can be deduced from the description of FIG. 6. In one embodiment, the rectification circuit 245 is configured to full-wave rectify the sensing signal VCS to generate the resonant-related signal VCSa. In this embodiment, the resonant-related signal VCSa is further differentially amplified by the buffer 30 to generate the amplified signal VCSa', which is positively related to the resonant-related signal VCSa. In this embodiment, the differentiation circuit 251 includes a differentiation capacitor Cd, a differentiation resistor Rd, and an inverting amplifier 290. The differentiation capacitor Cd and the differentiation resistor Rd are configured to differentiate the amplified signal VCSa' to generate a differentiation signal VCSd. The differentiation signal VCSd is processed by the inverting amplifier 290 to generate the ramp signal Vramp. For other operational details not mentioned above, please refer to the description of FIG. 6.

Please refer to both FIG. 3 and FIG. 10. As shown in FIG. 3, in the embodiment of FIG. 10, the ramp signal Vramp is related to the differentiation of the resonant-related signal VCSa. For example, at time point t1, the differentiation signal VCSd is generated based on the differentiation of the resonant-related signal VCSa, and the ramp signal Vramp is generated by inverting the differentiation signal VCSd. It should be noted that when the present invention is configured as the relevant embodiments of FIG. 4 (FIG. 4, FIG. 6 to FIG. 9), the ramp signal Vramp in FIG. 3 is generated based on the integration of the resonant-related signal VCSa. When the present invention is configured as the relevant embodiments of FIG. 5 (FIG. 5 and FIG. 10), the ramp signal Vramp in FIG. 3 is generated based on the differentiation of the resonant-related signal VCSa. For details on waveforms other than differentiation, please refer to the previous description of FIG. 3.

Furthermore, in one embodiment, the differentiation signal VCSd can also correspond to a type of ramp signal, which is compared with the compensation signal Comp to determine the switching phase of the first drive signal HS and the second drive signal LS.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant power converter, comprising:

a first transistor and a second transistor, configured to form a half-bridge circuit;

a resonant circuit, including a resonant inductor, a primary winding of a transformer, and a resonant capacitor, wherein the resonant inductor, the primary winding of the transformer, and the resonant capacitor are serially coupled to each other, and wherein the first transistor and the second transistor are configured to switch the resonant circuit to generate a resonant current for converting an input voltage into an output voltage; and a conversion control circuit, configured to generate a ramp signal based on the resonant current, and to generate a first drive signal and a second drive signal based on the ramp signal and a compensation signal related to the output voltage, wherein the first drive signal and the second drive signal are respectively configured to control the first transistor and the second transistor;

wherein during a signal period of the ramp signal, the ramp signal monotonically increases or monotonically decreases;

wherein the conversion control circuit includes a rectification circuit configured to full-wave rectify a sensing signal related to the resonant current to generate a resonant-related signal associated with the resonant current, wherein the ramp signal is generated based on the resonant-related signal.

2. The resonant power converter of claim 1, wherein during a switching period of the first drive signal or the second drive signal, an ON-time of the first drive signal and an ON-time of the second drive signal are optionally equal or unequal.

3. The resonant power converter of claim 1, wherein the signal period of the ramp signal is shorter than a switching period of the first drive signal or the second drive signal.

4. The resonant power converter of claim 1, wherein the conversion control circuit is further configured to adjust a switching period of the first drive signal and/or the second drive signal based on a comparison of the ramp signal and the compensation signal, thereby adjusting a phase of the resonant current to regulate an output power level related to the output voltage.

5. The resonant power converter of claim 1, wherein the ramp signal is further generated based on a differentiation or integration of a resonant-related signal associated with the resonant current.

6. The resonant power converter of claim 1, wherein the conversion control circuit further includes:
- a trans-conductance amplification circuit, configured to generate a trans-conductance amplified current based on the resonant-related signal; and
- an integration circuit, including an integration capacitor, configured to integrate an integration current to generate the ramp signal, wherein the integration current includes the trans-conductance amplified current;
- wherein the first drive signal and the second drive signal are further generated based on a comparison of the ramp signal and the compensation signal.

7. The resonant power converter of claim 1, wherein the rectification circuit includes:
- a plurality of switches, including a first group of switches and a second group of switches, the first group of switches and the second group of switches being coupled with each other, wherein the first group of switches are configured to switch according to the first drive signal, and the second group of switches are configured to switch according to the second drive signal, thereby full-wave rectifying the sensing signal to generate the resonant-related signal.

8. The resonant power converter of claim 1, wherein the conversion control circuit further includes a sensing circuit configured to generate the sensing signal based on the resonant current.

9. The resonant power converter of claim 6, wherein the integration current further includes a ramp compensation current for compensating a slope of the trans-conductance amplified current.

10. The resonant power converter of claim 9, wherein the ramp compensation current is related to the input voltage for achieving feedforward control.

11. The resonant power converter of claim 1, wherein the conversion control circuit includes:
- a differentiation circuit configured to differentiate the resonant-related signal to generate the ramp signal;
- wherein the first drive signal and the second drive signal are further generated based on a comparison of the ramp signal and the compensation signal.

12. A conversion control circuit for controlling a resonant power converter, wherein the resonant power converter includes a first transistor, a second transistor, and a resonant circuit, wherein the first transistor and the second transistor are configured to form a half-bridge circuit, wherein the resonant circuit includes a resonant inductor, a primary winding of a transformer, and a resonant capacitor, wherein the resonant inductor, the primary winding of the transformer, and the resonant capacitor are serially coupled to each other, and wherein the first transistor and the second transistor are configured to switch the resonant circuit to generate a resonant current for converting an input voltage into an output voltage; the conversion control circuit comprising:
- a sensing circuit, configured to generate a sensing signal based on the resonant current; and
- a signal processing circuit, configured to generate a ramp signal based on the sensing signal;
- wherein the signal processing circuit includes:
- a rectification circuit, configured to full-wave rectify the sensing signal to generate a resonant-related signal associated with the resonant current, wherein the ramp signal is generated based on the resonant-related signal;
- wherein the conversion control circuit is configured to generate a first drive signal and a second drive signal based on the ramp signal and a compensation signal related to the output voltage, wherein the first drive signal and the second drive signal are respectively configured to control the first transistor and the second transistor;
- wherein during a signal period of the ramp signal, the ramp signal monotonically increases or monotonically decreases.

13. The conversion control circuit of claim 12, wherein the signal processing circuit further includes:
- a trans-conductance amplification circuit, configured to generate a trans-conductance amplified current based on the resonant-related signal; and
- an integration circuit, including an integration capacitor, configured to integrate an integration current to generate the ramp signal, wherein the integration current includes the trans-conductance amplified current;
- wherein the first drive signal and the second drive signal are further generated based on a comparison of the ramp signal and the compensation signal.

14. The conversion control circuit of claim 13, wherein the integration current further includes a ramp compensation current for compensating a slope of the trans-conductance amplified current.

15. The conversion control circuit of claim 14, wherein the ramp compensation current is related to the input voltage for achieving feedforward control.

16. The conversion control circuit of claim 12, wherein the rectification circuit includes:
- a plurality of switches, including a first group of switches and a second group of switches, the first group of switches and the second group of switches being coupled with each other, wherein the first group of switches are configured to switch according to the first drive signal, and the second group of switches are configured to switch according to the second drive signal, thereby full-wave rectifying the sensing signal to generate the resonant-related signal.

17. The conversion control circuit of claim 12, wherein the signal processing circuit includes:
- a differentiation circuit, configured to differentiate the resonant-related signal to generate the ramp signal;
- wherein the first drive signal and the second drive signal are further generated based on a comparison of the ramp signal and the compensation signal.

18. The conversion control circuit of claim 12, wherein during a switching period of the first drive signal or the second drive signal, an ON-time of the first drive signal and an ON-time of the second drive signal are optionally equal or unequal.

19. The conversion control circuit of claim 12, wherein the signal period of the ramp signal is shorter than a switching period of the first drive signal or the second drive signal.

20. The conversion control circuit of claim 12, further configured to adjust a switching period of the first drive signal and/or the second drive signal based on a comparison of the ramp signal and the compensation signal, thereby adjusting a phase of the resonant current to regulate an output power level related to the output voltage.

21. The conversion control circuit of claim 12, wherein the ramp signal is further generated based on a differentiation or integration of a resonant-related signal associated with the resonant current.

22. A conversion control method for controlling a resonant power converter, wherein the resonant power converter includes a first transistor, a second transistor, and a resonant circuit, wherein the first transistor and the second transistor are configured to form a half-bridge circuit, wherein the resonant circuit includes a resonant inductor, a primary winding of a transformer, and a resonant capacitor, wherein the resonant inductor, the primary winding of the transformer, and the resonant capacitor are serially coupled to each other, and wherein the first transistor and the second transistor are configured to switch the resonant circuit to generate a resonant current for converting an input voltage into an output voltage; the conversion control method comprising:

generating a sensing signal based on the resonant current;

generating a ramp signal based on the sensing signal; and generating a first drive signal and a second drive signal based on the ramp signal and a compensation signal related to the output voltage, wherein the first drive signal and the second drive signal are respectively configured to control the first transistor and the second transistor;

wherein during a signal period of the ramp signal, the ramp signal monotonically increases or monotonically decreases;

wherein the step of generating the ramp signal includes:

full-wave rectifying the sensing signal to generate a resonant-related signal associated with the resonant current; and generating the ramp signal based on the resonant-related signal.

23. The conversion control method of claim 22, wherein the step of generating the ramp signal further includes:

generating a trans-conductance amplified current based on the resonant-related signal; and integrating an integration current to generate the ramp signal, wherein the integration current includes the trans-conductance amplified current;

wherein the step of generating the first drive signal and the second drive signal includes: comparing the ramp signal with the compensation signal.

24. The conversion control method of claim 23, wherein the integration current further includes a ramp compensation current for compensating a slope of the trans-conductance amplified current;

wherein the ramp compensation current is related to the input voltage for achieving feedforward control.

25. The conversion control method of claim 22, wherein the step of generating the ramp signal further includes: differentiating the resonant-related signal to generate the ramp signal;

wherein the step of generating the first drive signal and the second drive signal includes: comparing the ramp signal with the compensation signal.

26. The conversion control method of claim 22, wherein during a switching period of the first drive signal or the second drive signal, an ON-time of the first drive signal and an ON-time of the second drive signal are optionally equal or unequal; wherein the signal period of the ramp signal is shorter than a switching period of the first drive signal or the second drive signal.

27. The conversion control method of claim 22, wherein the step of generating the first drive signal and the second drive signal includes: adjusting a switching period of the first drive signal and/or the second drive signal based on a comparison of the ramp signal and the compensation signal, thereby adjusting a phase of the resonant current to regulate an output power level related to the output voltage.

* * * * *